(No Model.)
J. C. MITCHELL.
CAR STARTER AND BRAKE.
No. 356,491. Patented Jan. 25, 1887.
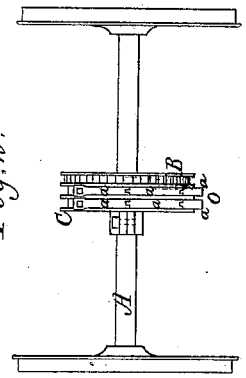
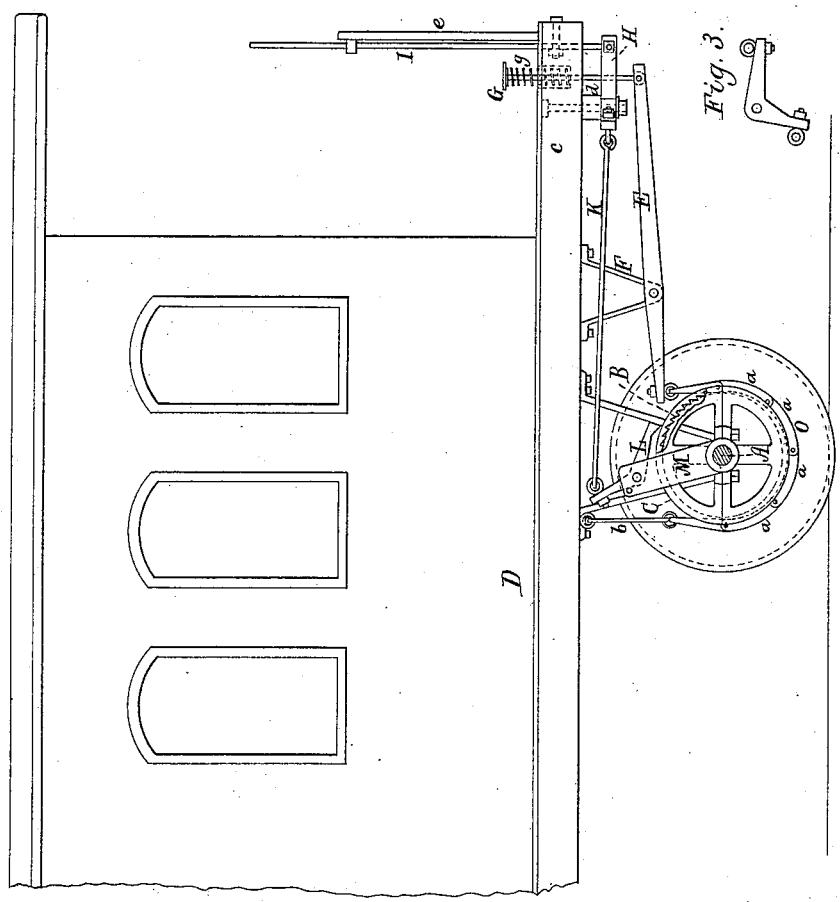
Witnesses
S. N. Piper
W. B. Torrey
Inventor
James C. Mitchell
by R. H. Eddy atty.

UNITED STATES PATENT OFFICE.

JAMES CHARLES MITCHELL, OF LANCASTER, NEW HAMPSHIRE.

CAR STARTER AND BRAKE.

SPECIFICATION forming part of Letters Patent No. 356,491, dated January 25, 1887.

Application filed November 8, 1886. Serial No. 218,283. (No model.)

*To all whom it may concern:*

Be it known that I, JAMES CHARLES MITCHELL, of Lancaster, in the county of Coos, of the State of New Hampshire, have invented a new and useful Improvement in Car Stoppers and Starters; and I do hereby declare the same to be described in the following specification and represented in the accompanying drawings, of which—

Figure 1 is a side elevation of my car stopping and starting mechanism as applied to a tramway-car. Fig. 2 is a view of a pair of wheels and their axles with its brake and starting-wheels. Fig. 3 is a top view of the angular lever constituting a part of the brake-operating mechanism.

The nature of my invention is defined in the claim hereinafter presented.

In carrying out my said improvement I fasten on one of the car-axles A, concentrically therewith, a rachet-wheel, B, having secured to one side of it a brake-wheel, C, also concentric with the axle. Partly around the periphery of such brake-wheel there extends one or a pair of brakes, O, or chains, each consisting of a series of curved metallic links, $a$, jointed together, the terminal links having at their outer ends eyes for connecting them at one end by a pendulous link, $b$, to the bottom of the car D, and at the other end to the shorter arm of a lever, E, arranged beneath the car and fulcrumed to a hanger, F, projecting from such bottom. A pedal or headed rod, G, jointed to the front arm of the lever, extends loosely up through the platform $c$ of the car, and is provided with a spiral spring, $g$, for forcing it (the said rod) upward, in order to loosen the brakes upon their wheel. Furthermore, there is arranged beneath and fulcrumed to the platform of the car, or to a projection, $d$, therefrom, an angular lever, H, one arm of which is jointed to a lever, I, that extends up through and is fulcrumed to the platform, and is arranged as represented—that is, just in rear of the dasher $e$. The other arm of the lever I is joined by a connecting-rod, K, to an angular lever-pawl, L, which at its middle is pivoted to an arm, M, pivoted upon the axle and extending upward therefrom, as shown in Fig. 1. The pawl is placed directly over and engages with the ratchet-wheel.

In order to stop or partially arrest the car while it may be in motion, the driver has only to place his foot on the pedal and press it downward, so as to bring the brake or brakes into action on their wheel. To start the car forward, he is to seize hold of the upper arm of the lever I and turn it downward, in which case the lever-pawl, by its action on the ratchet-wheel, will revolve it, and thereby cause the axle and its wheels to turn and advance the car without the horses or animals used for its propulsion being improperly strained in effecting the starting of the car.

The ratchet and brake wheels I usually make in semicircular sections, provided with flanges to enable them to be applied and bolted to the axle.

I claim—

The car stopper and starter, substantially as described, applied to the axle and body of a railway-car, and consisting of the ratchet and brake wheels fixed upon the axle, the chain brake or brakes applied to the brake-wheel, the lever and pedal and its operative spring for working the brake or brakes, the retracting-arm pivoted on the axles, the lever-pawl fulcrumed to such arm, and the two levers, their connecting-rod arranged with and applied to the pawl and to the car-platform, all being arranged and to operate essentially as specified.

JAMES CHARLES MITCHELL.

Witnesses:
R. H. EDDY,
R. B. TORREY.